(12) United States Patent
Hashizume

(10) Patent No.: US 6,773,609 B1
(45) Date of Patent: Aug. 10, 2004

(54) ADVANCED WATER TREATMENT SYSTEM AND ADVANCED WATER TREATMENT METHOD

(76) Inventor: Kazuto Hashizume, 908. Ueta, Nankoku-shi, Kochi 783-0063 (JP)

(*) Notice: Subject to any disclaimer, the term of this patent is extended or adjusted under 35 U.S.C. 154(b) by 154 days.

(21) Appl. No.: 09/868,632

(22) PCT Filed: Oct. 30, 2000

(86) PCT No.: PCT/JP00/07626

§ 371 (c)(1),
(2), (4) Date: Sep. 4, 2001

(87) PCT Pub. No.: WO01/30706

PCT Pub. Date: May 3, 2001

(30) Foreign Application Priority Data

Oct. 28, 1999 (JP) .................................. PCT/JP99/05991

(51) Int. Cl.⁷ ................................................ C02F 1/461
(52) U.S. Cl. ........................ 210/748; 210/759; 210/760; 210/192; 210/194; 210/205; 210/252; 210/909; 210/916
(58) Field of Search ................................ 210/748, 752, 210/759, 760, 192, 194, 199, 205, 252, 909, 916

(56) References Cited

U.S. PATENT DOCUMENTS

| | | | |
|---|---|---|---|
| 5,130,032 A | * | 7/1992 | Sartori |
| 5,851,399 A | | 12/1998 | Leitzke |
| 5,855,775 A | * | 1/1999 | Kerfoot |
| 6,103,130 A | * | 8/2000 | Sherman |
| 6,117,334 A | * | 9/2000 | Coury et al. |

FOREIGN PATENT DOCUMENTS

| | | |
|---|---|---|
| JP | 52-1955 | 1/1977 |
| JP | 52-135879 | 11/1977 |
| JP | 54-150849 | 11/1979 |
| JP | 4-66187 | 3/1992 |
| JP | 4-74593 | 3/1992 |
| JP | 5-26187 | 4/1993 |
| JP | 6-31287 | 2/1994 |
| JP | 6-277660 | 10/1994 |
| JP | 7-3796 | 1/1995 |
| JP | 7-265885 | 10/1995 |
| JP | 11-33593 | 2/1999 |
| JP | 11-253970 | 9/1999 |
| JP | 11-267673 | 10/1999 |

* cited by examiner

Primary Examiner—Betsey Morrison Hoey
(74) Attorney, Agent, or Firm—Rader, Fishman & Grauer PLLC

(57) ABSTRACT

An improved method for water treatment which comprises subjecting a water to be containing a hazardous material such as a dioxin or PCB to an ozone treatment contacting the water with fine bubbles of ozone having an average diameter of 0.5 to 3 microns; and a combination of the ozone treatment with one or more of a hydrogen peroxide treatment, a UV radiation treatment, an electrolysis treatment and a treatment with a carbonaceous filter material. The above ozone treatment or combination of treatments can be used for surer realization on of an intended effect of a water treatment, which is difficult to achieve by the use of a conventional method wherein ozone or hydrogen peroxide is simply mixed with a water to be treated. In particular, the combination of treatments leads to a more improved effect of water treatment.

30 Claims, 3 Drawing Sheets

ADVANCED WATER TREATMENT SYSTEM
AND ADVANCED WATER TREATMENT
METHOD

TECHNICAL FIELD

This invention relates to an advanced water treatment technique for oxidative destruction of harmful substances typified by environmental hormones, such as dioxins and PCB, by using the strong oxidation power of ozone.

BACKGROUND OF THE INVENTION

Today, we face the growing problem of how to deal with harmful substances, such as environmental hormones, on the earth. Dioxins are typical examples of harmful substances. It is reported that dioxins generated in Japan (those generated by incinerator plants of its municipalities alone) amount to 2,800 grams (fiscal 1998). To cope with this problem, controls of incinerator plants, sources of generation of dioxins, are being made stricter so as to limit the amounts of dioxins generated thereat.

However, restrictions alone on the generation of dioxins is not sufficient for reduction of the amount of dioxins present in the environment, because once they are generated, they circulate through the environment without being destroyed. Therefore, unless dioxins circulating in the environment are destroyed to thereby end their circulation while the amount of generation thereof is restricted, the whole amount of dioxins in nature cannot be decreased.

For instance, dioxins circulate in the environment as follows: Dioxins once released from an incinerator plant contaminate food, such as agricultural, livestock and fishery products, enter human bodies via the food, and then are discharged as wastes from human bodies into the environment. Those wastes containing harmful substances, such as dioxins, are collected in human wastes treatment facilities and public sewage works, or put together in single or joint private sewage systems all over the country and flow therefrom into rivers and then into the sea.

As described above, dioxins collected in human wastes treatment facilities or public sewage works via human wastes are released into the environment without being decomposed. Harmful substances released into the environment repeatedly return to human bodies via fishery products and the like while being increased in concentration. As described hereinabove, unless the vicious circle in the circulation of dioxins is broken anywhere, adverse influences of dioxins present in the environment on human bodies cannot be reduced even if only the amount of generation of dioxins is restricted.

The ozone treatment and the hydrogen peroxide solution treatment are known as techniques of decomposing harmful substances present in water to be treated. According to these treatments, it is true that harmful substances were subjected to oxidative destruction to some purpose, but almost all of these techniques only mix ozone and hydrogen peroxide solution with water to be treated, or simply agitate the resulting mixture. Therefore, it cannot be necessarily said that they are capable of fully achieving the effects of destroying harmful substances. Even now, harmful substances, including dioxins, continue to increase in water systems in the environment, and hence the advent of a new advanced water treatment technique has been desired which promises more excellent treatment effects.

DISCLOSURE OF THE INVENTION

The present invention has been made in order to meet the above-described demand. That is, an object of the present invention is to provide an advanced water treatment technique that does not simply make use of ozone, differently from the conventional water treatment technique, but is based on an ozone treatment which is capable of braking a vicious circle of harmful substances, such as dioxins, through wastes discharged from human bodies, by providing more advanced treatment effects.

To attain the above object, the advanced water treatment process according to the present invention is based on an essential treatment process for bringing minute bubbles of ozone having an average particle diameter (bubble diameter) of e.g. 0.5 to 3 $\mu$m into contact with water to be treated, which contains harmful substances, such as dioxins and PCB, thereby carrying out the ozone treatment for oxidative destruction of the harmful substances contained in the water. In a more concrete form, an advanced water treatment system of the present invention is characterized by comprising an ozone treatment device for bringing minute bubbles of ozone having an average particle diameter (bubble diameter) of e.g. 0.5 to 3 $\mu$m into contact with the water to be treated, in a retentive manner, thereby carrying out oxidative destruction of the harmful substances.

According to this advanced water treatment process and system, ozone is not simply supplied to the water to be treated but minute bubbles of ozone are supplied to the water to be treated. More specifically, each minute bubble of ozone has a very small buoyant force, and hence ozone can be caused to stay within the water for a much longer time period. Further, areas of ozone brought into contact with the water can be made by far the larger. As a result, differently from the conventional water treatment process in which aeration is simply carried out with ozone, the efficiency of oxidation of harmful substances dissolved in the water can be dramatically improved.

The "water to be treated" for treatment by the advanced water treatment process and system of the present invention includes water at high pollution levels, such as waste water containing sludge and soil, human excreta, sewage water containing excreta of domestic animals, household waste water, clinical waste water, papermaking waste water, and industrial liquid waste, and water at low pollution levels, such as water in rivers or lakes, water used in bathhouses, swimming pools, and the like. In short, since the treatment is intended for decomposing harmful substance, so long as the water to be treated contains harmful substances, the kind of a pollution source does not matter.

Further, the harmful substances which can be decomposed include dioxins, PCB, and other environmental hormones. It goes without saying that the present process and system is capable of sterilizing infective disease such as *Escherichia coli*, salmonella, and mad cow disease.

Further, the advanced water treatment system may be of a fixed type, or an in-vehicle mobile type, but is characterized by the capability of continuous treatment.

As described hereinabove, the ozone in the form of minute bubbles has a very small buoyant force and stays within the water for a very long time period. Therefore, there is a difficulty that if only the minute bubbles of ozone are simply supplied to the ozone treatment tank, it takes much time for the ozone to be uniformly diffused throughout the water within the tank, and hence the high oxidative destruction power of the ozone realized in the form of minute bubbles is not fully made use of. Therefore, in the water treatment process of the present invention, as one method of evenly diffusing the minute bubbles of ozone, the minute bubbles are supplied to a water pipe which is provided for connecting each treatment tank arranged within a treatment system. The water is flowing violently through the water pipe, so that ozone formed into minute bubbles by "ozone supply means" comprised of an ozone generator and an ozone bubble-forming device (line mixer type, or vortex flow turbine pump type) is supplied to the water flowing through the water pipe, whereby the minute bubbles of ozone are injected into the ozone treatment tank in a gushing flow and evenly diffused throughout the inside of the tank.

Further, in another method of diffusing the minute bubbles of ozone, an ozone treatment tank for bringing the minute bubble of ozone into contact with the water to be treated in a retentive manner is provided within the treatment system, and the ozone is blown from the bottom of the tank into the water within the tank to cause a forced convection of the water. In other word, an ozone treatment tank for bringing the minute bubbles of ozone into contact with the water to be treated in a retentive manner is provided within the treatment system, and the water within the tank and the minute bubbles of ozone supplied from the ozone generator are vigorously moved around to produce a forced convection state of the water. An ozone treatment device using the ozone bubble-forming device (rotational type) arranged at the bottom of the ozone treatment tank carries out the ozone treatment. In this case, the water to be treated and ozone are vigorously turned around to blow minute bubbles of ozone having an average particle size of 10 to 20 $\mu$m, or 50 to 60 $\mu$m, into the water in the tank.

Further, the advanced water treatment process and device may use one ozone treatment tank, but if a plurality of ozone treatment tanks are arranged at successive respective stages, they can provide enhanced oxidative destruction effects. Further, when the plurality of ozone treatment tanks are provided, the tanks should not be simply arranged at respective successive stages, but it is preferred that extra ozone coming up from the water within the latter-stage ozone treatment tank is caused to be circulated to the former-stage ozone treatment tank for effective utilization of ozone.

Further, the advanced water treatment process and system is capable of performing oxidative destruction of almost all harmful substances in the water to be treated, by utilizing the minute bubbles of ozone. However, the present invention further performs a desired combination of a hydrogen peroxide solution treatment, an electrolysis treatment, an ultraviolet radiation treatment, and a carbonized filter medium contract treatment (carbonized filter medium treatment) to thereby more effectively decompose the harmful substances.

One combination-type treatment provides an example suitable for advanced treatment of waste water at relatively low pollution levels, including water from waterworks, swimming pools, and bathhouses, and water in rivers. In this example, the advanced water treatment process and system is configured such that the ozone treatment, the ultraviolet radiation treatment, and the carbonized filter medium contact treatment are carried out in the mentioned order. It should be noted that the ultraviolet radiation treatment decomposes harmful chlorides by dechlorination reaction through irradiation of ultraviolet rays. The carbonized filter medium treatment eliminates harmful substances remaining untreated within the water by adsorbing them by a special filter medium.

The waste water to be treated here has a relatively low pollution load, and hence the ozone treatment can decompose almost all harmful substances, but harmful substances which remain even after the ozone treatment are treated or processed by the ultraviolet radiation treatment. Then, the water to be subjected to the ultraviolet radiation treatment contains ozone in the form of minute bubbles mixed therein by the ozone treatment at the preceding stage, and hence hydroxyl radical (OH$^-$) having a high oxidative power can be generated in a larger amount to provide high decomposition effects. Then, by carrying out the carbonized filter medium contact treatment thereafter, heavy metals, such as aluminum, arsenic, and cadmium, contained in the water to be treated are adsorbed for elimination from the water. As the carbonized filter for use in the treatment, the use of a conifer carbonized filter material obtained by carbonizing raw materials of a plurality of kinds of conifer, including cedar, pine, and Japanese cypress (hinoki) at a high temperature range of 800 to 900° C. enhances absorptive action of the medium to a very high degree. By subjecting the water to the above-mentioned sequence of treatments, it is possible to obtain water which is purified to a quality level suitable for drinking water. Further, this treatment process and system can attain sufficient treatment effects by relatively simple treatment, and the costs therefor can be held at a low level.

Another combination-type treatment provides an example suitable for advanced treatment of waste water having a relatively high pollution load, such as human excreta, sewage water, and waste water from agricultural community. In this example, the advanced water treatment process and system is configured such that the hydrogen peroxide solution treatment, the ozone treatment, the ultraviolet radiation treatment, and the carbonized filter medium contact treatment are carried out in the mentioned order. It should be noted that the hydrogen peroxide solution treatment admixes the hydrogen peroxide solution as a liquid in the water to be treated, whereby microorganisms are sterilized and the harmful substances are oxidized, by the oxidative power of the hydrogen peroxide solution.

The waste water treated in this example have relative high pollution loads, and are required to treat human excreta. Therefore, the hydrogen peroxide solution treatment for processing foul odor and human excreta residue is carried out prior to the ozone treatment. In this case, it is advantageous that the foul-odor air generated from the water to be treated within the treatment system is mixed into the hydrogen peroxide solution as minute bubbles having an average particle diameter of approximately 0.01 to 0.2 mm, for oxidative destruction thereof. By forming the foul-odor air into the minute bubbles, the oxidative destruction thereof by the hydrogen peroxide can be carried out with high efficiency. In respect of high-efficiency treatment, it is more advantageous that pH of the water to be treated is adjusted to 8 to 10 in advance, and still further advantageous that at least one of gold, copper oxide, and iron oxide is thrown into the water, for promotion of the oxidative treatment by the hydrogen peroxide. Then, after the hydrogen peroxide solution treatment, the ozone treatment, the ultraviolet radiation treatment, and the carbonized filter medium contact treatment are carried out, whereby the water to be treated can be purified to a quality level suitable for drinking water.

A still another type of the treatment is an example suitable for advanced treatment of waste water containing harmful heavy metals, such as industrial liquid waste from a particular factory, and waste water from a final waste disposal plant. In this example, the advanced water treatment process and system is configured such that the hydrogen peroxide solution treatment, the electrolysis treatment, and the ozone treatment are carried out in the mentioned order. It should be noted that the electrolysis treatment is one which is executed for eliminating heavy metals, such as arsenic, cyanogen, aluminum, cadmium, and the like, which cannot be decomposed by oxidative treatment or dechlorination treatment.

Since the waste water treated here contains heavy metals, the above-mentioned hydrogen peroxide solution treatment is carried out, and then the electrolysis treatment is carried out. This enables the electrolysis treatment to be carried out with high efficiency owing to hydrogen peroxide solution remaining within the water subjected to the hydrogen peroxide solution treatment. After the heavy metals are thus eliminated, the above-mentioned ozone treatment is carried out whereby the water to be treated can be purified to a quality level suitable for drinking water.

As the tank for carrying out the ultraviolet radiation treatment, it is advantageous that an ultraviolet radiation treatment tank is provided which has an ultraviolet light source and inner walls coated with titanium dioxide, and it is further advantageous to carry out a photocatalytic treatment by irradiating ultraviolet rays to the inner walls to consume the foul odor in combination with the ultraviolet radiation treatment. This can more efficiently enhance the efficiency of decomposing the harmful substances by hydroxyl radical. The ultraviolet radiation treatment tank can be configured such that it has a plurality of partition walls coated with titanium dioxide, with partition walls being arranged such that the distance between adjacent ones of the partition walls is within 30 cm. More specifically, the ultraviolet radiation treatment tank has a body in the form of a bottomed hollow cylinder extending vertically, an ultraviolet lamp being arranged in a diametrical center of the body, with the plurality of partition walls having plate surfaces radially extending toward the ultraviolet lamp positioned in the center of the arrangement of partition walls. This enables the electrons causing photocatalytic action to be dispersed evenly throughout the inside of the treatment tank, whereby the photocatalytic effects can be fully provided.

Although each of the above-mentioned types is composed of a sequence of treatments, this is not limitative, but it goes without saying the for each treatment stage, a settling tank may be provided for carrying out the settling treatment, to thereby eliminate impurities contained in the water to be treated.

Further, an aeration treatment may be carried out for a biological treatment of organic contaminants contained in the water to be treated.

In all of the above-mentioned cases, treated water obtained by the advanced water treatment process and system ensures a water quality at a level higher than a level satisfying 26 drinking water-suited water quality criteria defined by the Japanese food sanitation law.

Figure 1:
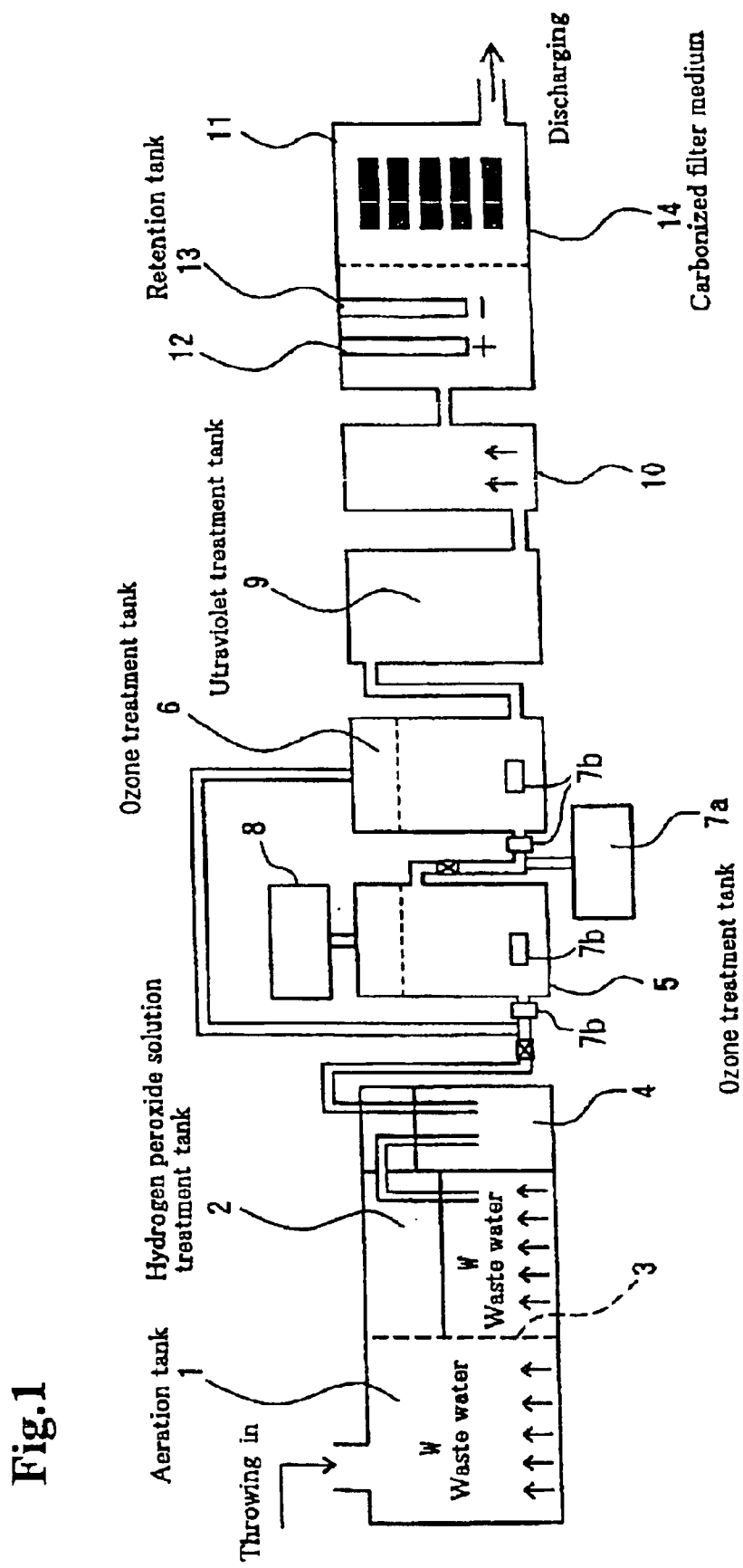
FIG. 1 is a diagram showing an advanced water treatment system (facility) of a fixed type, according to an embodiment of the present invention.

DESCRIPTION OF REFERENCE NUMERALS 1 aeration, tank
2 hydrogen peroxide solution treatment tank
3 partition wall (net)
4 storage tank
5, 6 ozone treatment tank
7a silent discharge ozone generator
7b ozone bubble-forming devices
8 waste ozone-disposal treatment device (detoxification device)
9 ultraviolet radiation treatment tank
10 pH adjustment tank
11 retention tank
12, 13 electrodes
14 carbonized filter medium
15 large-sized truck
16 storage tank
17 vacuum generator
18 generator unit
19 screen
20, 21 ozone treatment tank
22a ozone generator
22b ozone bubble-forming devices
23 waste ozone-disposal treatment device
24 ultraviolet radiation treatment tank
25 carbonized filter medium treatment tank
26 retention tank
27 carbonized filter medium
W waste water

BEST MODE FOR CARRYING OUT THE INVENTION

The present invention will now be described in detail with reference to FIG. 1 showing an embodiment thereof. FIG. 1 is a diagram showing a facility of a fixed type including an advanced water treatment system according to the present invention. An aeration tank 1 is a tank into which waste water W containing human excreta is first thrown by a vacuum car and the like. In this aeration tank 1, minute bubbles of approximately 0.01 to 0.02 mm in diameter are breathed in from below for settling and separating foreign matters (hardened materials). By breathing minute bubbles into the aeration tank 1 as described above, it becomes possible to prolong a time period for holding minute bubbles in water, and increase a contact area of air with water to be treated, thereby making it possible to enhance efficiency of oxidization of organic substances dissolved in the water. Further, in the aeration tank 1, slaked lime is thrown into the waste water W for alkalization of the same.

Arranged in a manner adjacent to the aeration tank 1 is a hydrogen peroxide solution treatment tank 2 for carrying out a hydrogen peroxide solution treatment. There is provided a partition 3 in the form of a net between the tank 2 and the aeration tank 1 such that the foreign materials are prevented from entering the tank 2. The waste water W having a pH adjusted to 8 to 10 is moved into the tank 2, and an aqueous hydrogen peroxide solution is poured into the tank 2. It should be noted that the waste water W is alkalinized in advance since the alkalization contributes to enhancement of the oxidizing and decomposing power of the aqueous hydrogen peroxide solution. Slaked lime, for instance, is suitable for a pH adjuster. Similarly to the aeration tank 1, in the hydrogen peroxide solution treatment tank 2 as well, minute bubbles are breathed in from below, and hence the aqueous hydrogen peroxide solution poured in is mixed with the waste water W by the agitating effect of the minute bubbles. This is because it is preferable to mix waste water W with the hydrogen peroxide solution by air agitation. When the aqueous hydrogen peroxide solution is mixed with the waste water W, oxygen (O) is released, and the oxygen can perform oxidative destruction of harmful substances, such as dioxins and the like, contained in the waste water W. In order to increase a deodorizing effect of the hydrogen peroxide solution treatment tank 2, the inner surfaces of an upper part of the tank 2 are coated with titanium dioxide, and a fluorescent light is arranged on a ceiling portion of the tank 2. This is to cause titanium dioxide to perform the photocatalytic function to thereby enhance the deodorizing effect of the tank 2. Further, an electric fan is arranged at an upper portion inside the tank 2, for stirring air within the tank, which contributes to reinforcement of the photocatalytic function.

The waste water W is once stored in a storage tank 4 after being subjected to the hydrogen peroxide solution treatment. The waste water W having passed through the storage tank 4 is fed to an ozone treatment device which is comprised of ozone bubble-forming devices 7b, an ozone generator 7a, and ozone treatment tanks 5 and 6, for carrying out ozone treatment. The ozone treatment is carried out in the ozone treatment device. Inside the ozone treatment tanks 5 and 6, harmful substances, such as dioxins and the like, contained in the water to be treated are oxidized and decomposed by the oxidation force of oxygen generated from ozone gases. Although only one tank may be arranged as an ozone treatment tank, normally, ozone treatment is carried out by using two serially-connected ozone treatment tanks. One of the ozone bubble-forming devices 7b which is connected to the silent discharge ozone generator 7a is connected to a piping for guiding the waste water (piping for guiding water to be treated) arranged in the vicinity of an inlet of the ozone treatment tank 6 at a latter stage of the water treatment system. From this ozone bubble-forming device 7b, ozone gases are supplied as minute bubbles of approximately 0.5 to 3 $\mu$m. The ozone gases breathed out from a lower portion of the latter-stage ozone treatment tank 6 once stay at an upper portion of the tank 6, and thereafter fed to the other ozone bubble-forming device 7b arranged in a piping in the vicinity of an inlet of the ozone treatment tank 5 at a former stage of the water treatment system. Then, the ozone gases formed into minute bubbles again are discharged into the former-stage ozone treatment tank 5. Out of the ozone gases fed to the former-stage ozone treatment tank 5, ozone stored in an upper portion thereof is released into the atmosphere after being detoxified by a waste ozone-disposal treatment device 8. This is for the purpose of making effective use of ozone. It should be noted that an amount of the ozone stored in the upper portion of the latter-stage ozone treatment tank 6 is equal to approximately one-tenth of the amount of the ozone injected, and the ozone bubble-forming device 7b arranged in the vicinity of the inlet of the former-stage ozone treatment tank 5 may have a capacity equal to approximately one-tenth of that of the ozone bubble-forming device 7b arranged in the vicinity of the inlet of the latter-stage ozone treatment tank 6. Further, the water treatment system is configured such that for the transfer of ozone from the latter-stage ozone treatment tank 6 to the former-stage ozone treatment tank 5, the concentration of ozone is detected, and the transfer of ozone is permitted when a predetermined concentration thereof is sensed. A waste ozone-disposal treatment can be effected in the following manner: After minute particle of ozone remaining in the air collected in the upper portion inside the ozone treatment tanks 5 is separated from the air by using a centrifugal separator, a reverse osmosis membrane device, or a filter medium, the particles of ozone are subjected to either a plasma incineration treatment or an adsorption treatment which is carried out by using a conifer special carbonized material made of a conifer which is produced through a high-temperature treatment of the conifer at temperatures between 800° C. and 900° C. over a predetermined time period or longer. In this embodiment, the plasma incineration treatment is carried out. Further, the ozone generator 7a used in this embodiment is a known silent discharge ozone generator, while the ozone bubble-forming device 7b is of a line mixer type which mixes ozone supplied from the conventional ozone generator 7a with waste water W, and causes the mixture of ozone and waste water W to simultaneously pass therethrough to thereby cause the minute bubbles of ozone to exist in water to be treated, by the stirring force of a line mixer thereof. According to this process, it is preferred that the bubbles of ozone have a particle diameter (bubble diameter) of 0.5 to 3 $\mu$m. This is because a particle diameter larger than 3 $\mu$m reduces efficiency of the ozone treatment and a particle diameter smaller than 0.5 $\mu$m makes it difficult to diffuse ozone bubbles into water to be treated, and requires an additional ozone diffusion device, such as an ultrasonic treatment device, thereby spoiling practicability of the ozone bubble-forming device 7b. Further, the amount of injected ozone (amount of ozone brought into contact with water to be treated) is determined depending on the amount of organic substances dissolved in water to be treated and the like. In this embodiment, the amount of injected ozone is set to 0.004 to 0.0015 mg (4 to 15 ppm) per liter of water to be treated, preferably 0.004 to 0.008 mg. If the amount of injected ozone is smaller than 0.004 mg/liter, the effect of injected ozone is reduced, while if the amount of injected ozone is larger than 0.015 mg/liter, the concentration of ozone in the waste water is saturated, which makes useless the injection of ozone at a rate in excess of 0.015 mg/liter. By setting the size of ozone bubbles and the amount of injection of ozone as described above, it becomes possible to carry out a continuous treatment of water to be treated which contains harmful substances, such as dioxins and the like, at a practical level, which could not be carried out by the conventional water treatment system. More specifically, conventionally, each bubble of injected ozone has a size of approximately 0.2 to 0.3 mm in diameter, and hence the ozone injected is caused to rise to the surface of water in an ozone treatment tank in several seconds. This results in an extremely short contact time period during which the ozone and the water are brought into contact with each other. Consequently, to decompose approximately 80% of toxic substances, it was required to continue injecting ozone in a large amount of 70 to 100 mg per liter of water to be treated for 30 to 300 minutes by method. On the other hand, according to the present embodiment, the oxidation reaction and solubility of ozone are enhanced to respective very high levels by injecting ozone having a particle or bubble diameter of 0.5 to 3 $\mu$m in an amount of 0.004 to 0.0015 mg per liter of water to be treated. This enables water treatment to be carried out at high efficiency. If the water is treated for 2 minutes in a continuous-type ozone treatment tank, it is possible to decompose approximately 80% of toxic substances. In the present embodiment, ozone formed into minute bubbles having a particle or bubble diameter of 0.5 to 3 $\mu$m is brought into contact with the water to be treated. This makes it possible to oxidize and decompose harmful substances at efficiency more than 100 times as high as that of the conventional water treatment system, and contributes to economical advantages including reduction of the initial costs and running costs of the treatment system, e.g. through downsizing of treatment devices used therein.

After having passed through the ozone treatment tanks 5 and 6, the waste water W is transferred to an ultraviolet radiation treatment device formed of an ultraviolet radiation tank 9, wherein the waste water W is irradiated with ultraviolet rays having a wavelength of approximately 180 nm to 310 nm. Ultraviolet radiation treatment is executed in the ultraviolet radiation tank 9, and dioxins and the like can be decomposed through a dechlorination reaction by the ultraviolet radiation. Further, in this process, it can be expected that a hydroxyl radical ($OH^-$) which is by far stronger than ozone in oxidative power can be generated by the presence of minute bubbles of ozone remaining in the waste water W in the ultraviolet radiation tank 9, and the ultraviolet radiation, and therefore, it can be expected that dioxins and the like which could not be decomposed only by the preceding steps of the ozone treatment can be reliably decomposed.

To increase efficiency of decomposition of harmful substances, such as dioxins and the like, by ultraviolet rays, titanium dioxide is coated on the inner surface of the ultraviolet radiation tank 9 to thereby employ decomposition using a photocatalyst in combination with the ozone treatment. In this case, the traveling distance of electrons emitted from the titanium dioxide involved in photocatalysis is approximately 15 cm, and hence when the ultraviolet radiation tank 9 is increased in size, it is required to divide the inside of the tank 9 such that the distance between the respective partitions is 30 cm or less. To meet the requirement, in the present embodiment, an ultraviolet lamp is arranged at a central axis portion of the cylindrical ultraviolet treatment tank. The ultraviolet treatment tank 9 is further provided with a plurality of partitions, not shown, which have surfaces coated with titanium dioxide. Each partition extends from a root end on an inner wall of the ultraviolet treatment tank 9 to a distal end in front of the ultraviolet lamp. The distance between adjacent partitions is set such that is not larger than 30 cm.

The waste water W having passed through the ultraviolet treatment tank 9 is once stored in a pH adjustment tank 10 in which slaked lime is thrown in for alkalization of the waste water W again.

After having passed through the pH adjustment tank 10, the waste water W is transferred to a retention tank 11 which is comprised of an electrolysis treatment tank for carrying out electrolysis and a carbonized filter medium treatment tank for effecting carbonized filter medium treatment. The retention tank 11 is provided with a pair of electrodes 12 and 13 for use in carrying out electrolysis, and a plurality of carbonized filter mediums. The electrolysis treatment is executed mainly for eliminating harmful heavy metals, such as arsenic, cyanogen, aluminum, cadmium, and the like, which are originally inoxidizable materials, from the waste water W. Electrolysis treatment devices are different from each other depending on kinds of harmful heavy metals contained in the waste water W and hence required to be eliminated therefrom. This is because when waste water including only aluminum, manganese, or NaCl is to be treated, a less expensive and simpler electrolysis treatment device is sufficient for treatment thereof, than when waste water including more poisonous metals, such as cadmium, arsenic, organo-tin, etc, is to be treated. This embodiment employs an electrolysis device capable of decomposing more harmful substances such as cadmium.

The carbonized filter medium treatment is executed for eliminating dioxins and the like which could not be decomposed completely by the preceding treatments, or originally inoxidizable, harmful heavy metals, such as arsenic, cyanogen, aluminum, cadmium, and the like. The carbonized filter medium 14 and the water to be treated are brought into contact with each other in the retention tank 11 in which 800 kg to 12,000 kg of the carbonized filter medium 14 is used when the water is treated at the rate of 1 kiloliter per 1 minute. If the water is caused to stay in the retention tank 11 for a longer time period, it is possible to reliably adsorb and eliminate the dioxins, the heavy metals, and other harmful substances. However, in order to carry out the continuous treatment as a characterizing feature of the present invention with efficiency, it is preferable to set a retention time period to 30 minutes or shorter. In this embodiment, the retention time period is set to 2 minutes, and as the carbonized filter mediums 14, there are used carbonized filter mediums of conifer wood, such as cedar wood, pine wood, Japanese cypress (hinoki) wood, and the like, which are more excellent in adsorptive power than activated carbons. This is because when activated carbons are employed, it takes at least approximately one hour of a retention time period, and it is required to change activated carbons for replacement in one year, whereas if conifer special carbonized filter mediums are used, 30 minutes of a retention time period is sufficient for the treatment, and moreover a time period for replacement can be prolonged to 5 years. Further, the conifer carbonized filter mediums 14 used in this embodiment are each formed by a mixture of cedar wood, pine wood, and cypress wood having micropores of 30 to 70 Å, 20 to 50 Å, and 10 to 30 Å, respectively, and they can adsorb a larger amount of harmful substance than activated carbons which have micropores uniform in size in a particular range. It should be noted that the conifer carbonized filter mediums 14 can be obtained by carbonizing raw wood comprised of a plurality of kinds of conifer wood, such as cedar wood, pine wood, and Japanese cypress (hinoki) wood, at high temperatures between 800° C. and 900° C.

The waste water W subjected to the above treatments acquires a water quality satisfying 26 drinking water-suited water quality criteria defined by the Japanese food sanitation law, and can be discharged to the environment as water above a drinking water quality level. Even if discharged to the environment, the treated waste water does not contain dioxins and the like, so that it is possible to break a vicious circle of poisonous substances. Further, the above-described treatments can extinguish all the bacteria and disease germs, including *Escherichia coli*, as well as deodorize and decolorize the waste water.

According to the present embodiment, even when photocatalytic treatment is not executed, it is possible to eliminate approximately 70% of the dioxins in the water to be treated only by the ozone treatment, and if the ozone treatment is carried out in combination with the ultraviolet radiation treatment, approximately 95% of the dioxins can be eliminated. If the photocatalytic treatment is effected in combination with the ozone treatment and the ultraviolet radiation treatment, approximately 99% of the dioxins can be eliminated. If the electrolysis treatment and the carbonized filter medium treatment are carried out together with the above treatments, approximately 100% of the dioxins can be eliminated. Further, it is possible to decompose and eliminate environmental hormones, such as PCB, nonyl phenol, nonionic surface active agents, etc, to values below the lower limit values of determinate quantities only by carrying out the ozone treatment.

It should be noted that the advanced water treatment system of the present embodiment treats waste water W at a rate of 0.025 to 14 kiloliters per minute.

Next, variations of the above embodiment will be described hereinafter.

The aeration tank suffers from the problem of a foul odor emitted from human excreta thrown therein. To overcome this problem, a deodorizing line can be provided as a separate member for drawing in foul odors stored in an upper portion of the aeration tank, transferring the same via a pipe different from the pipes for sewage water and discharging them from a lower portion of the hydrogen peroxide treatment tank.

In the hydrogen peroxide treatment tank, at least one of gold, copper oxide, and iron oxide may be used as a pro-oxidant to promote oxidation by hydrogen peroxide solution. By throwing these pro-oxidants in the hydrogen peroxide treatment tank, the oxidizing action of the hydrogen peroxide can be promoted. If the pro-oxidants are not in use, they may be lifted to the upper portion of the hydrogen peroxide treatment tank.

In the retention tank, similarly to the hydrogen peroxide treatment tank, the upper portion of the tank may be coated with titanium dioxide and exposed to a fluorescent light to thereby deodorize foul odors remaining in the upper portion of the tank by using the photocatalytic function of the titanium dioxide.

The method of generating minute bubbles of ozone for use in the ozone treatment includes a revolving method, and a vortex turbine pump method in addition to the line mixer method. The revolving method generates minute bubbles of zone in water to be treated, by turning around ozone and the mixture of the water to be treated by revolving blades or projections. This method makes it possible to form ozone into bubbles having a particle diameter of 10 to 60 $\mu$m. Further, the vortex turbine pump method forms ozone into minute bubbles by the agitating power of a turbine pump. This method makes it possible to form ozone into minute bubbles having a particle diameter of 20 to 80 $\mu$m. In the line mixer method, the particle diameter of minute bubbles of ozone is set to a range of 0.5 to 3 $\mu$m, in the revolving method, the particle diameter of minute bubbles of ozone is set to a range of 10 to 20 $\mu$m, or 50 to 60 $\mu$m, In the vortex turbine pump method, the particle diameter of minute bubbles of ozone is set to a range of 20 to 80 $\mu$m. In the revolving method and the vortex turbine pump method, the above mentioned range of particle diameter is for the bubbles of ozone since if the particle diameter is larger an upper limit of a corresponding one of the above ranges, treatment efficiency thereof is degraded, whereas if the particle diameter is smaller than a lower limit of the same, the manufacturing costs of an ozone bubble-forming device are increased, resulting in the unfavorable relationship between the treating effect and the manufacturing costs.

Further, the rate of injection of ozone (amount of ozone brought into contact with water to be treated) is determined depending on the amount of organic substances dissolved in the water to be treated and the like. In this variation, the rate of injection of ozone is set to 0.004 to 0.0015 mg (4 to 15 ppm) per liter of water to be treated. If the rate of injection of ozone is smaller than 0.004 mg/liter, the effect of injection of ozone is reduced, whereas if the rate of injection ozone is larger than 0.015 mg/liter, the treatment efficiency per amount of input ozone is degraded.

The method of supplying minute bubbles of ozone to the ozone treatment tanks are different depending on the type of ozone bubble-forming devices. In the case of the vortex turbine pump method, the method is the same as that of the line mixer method. That is, an ozone generator for generating minute bubbles of ozone is arranged in a water pipe to supply water having minute bubbles of ozone dispersed therein to the ozone treatment tanks. On the other hand, in the revolving method, there is no ozone bubble-forming device arranged in a waste pipe. Ozone bubble-forming devices are arranged on bottoms of the ozone treatment tanks for feeding minute bubble of ozone therefrom.

It should be noted that minute bubbles of ozone are almost instantly diffused throughout the ozone treatment tanks regardless of whichever method may be employed. Therefore, the ozone treatment tanks may have any shapes, such as a vertically long shape, a horizontally long shape, and the like.

In the waste ozone-disposal treatment, a waste ozone-disposal treatment tank is arranged at an upper portion of a front-side tank of two ozone treatment tanks communicating with each other, but it is preferable to execute waste ozone-disposal treatment also in another waste ozone-disposal treatment tank placed at a latter-stage side of the ultraviolet radiation tank. Further, it is possible to effectively utilize ozone to be disposed of, by transferring air remaining at the upper portion of the ozone treatment tank to the water storage tank for receiving the human excreta and the like, for deodorization. In this case, a waste ozone-disposal treatment tank is arranged at an upper portion of the water storage tank for receiving the human excreta and the like.

According to another embodiment of the present invention, in the water treatment system of a fixed type shown in FIG. 1, the electrolysis treatment to be effected in the retention tank 11 is carried out between the storage tank 4 and the ozone treatment tank 6. This makes it possible to utilize remaining aqueous hydrogen peroxide to carry out electrolysis efficiently.

Figure 2:
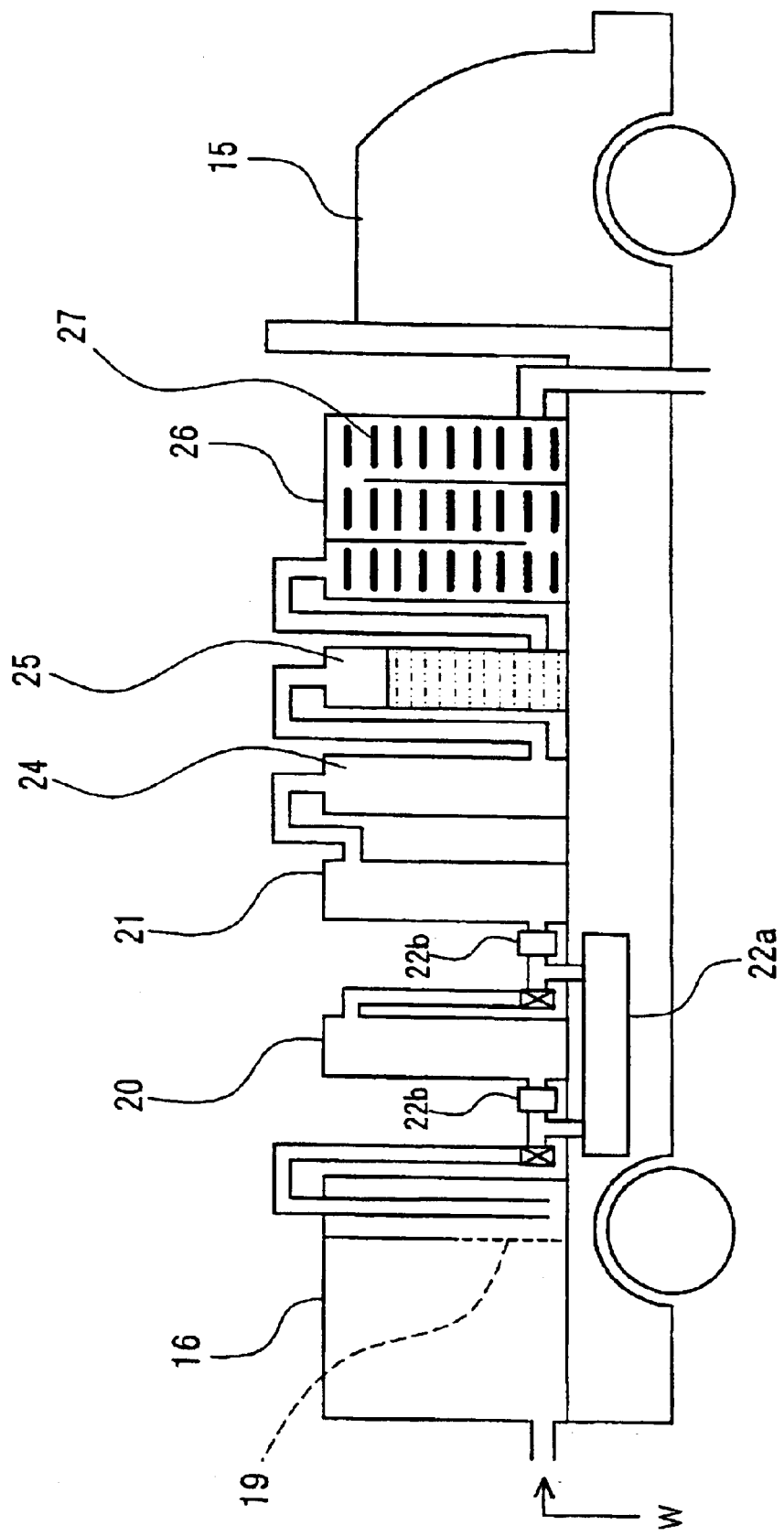
FIG. 2 is a diagram showing an advanced in-vehicle water treatment system (facility) according to another embodiment of the present invention.
Figure 3:
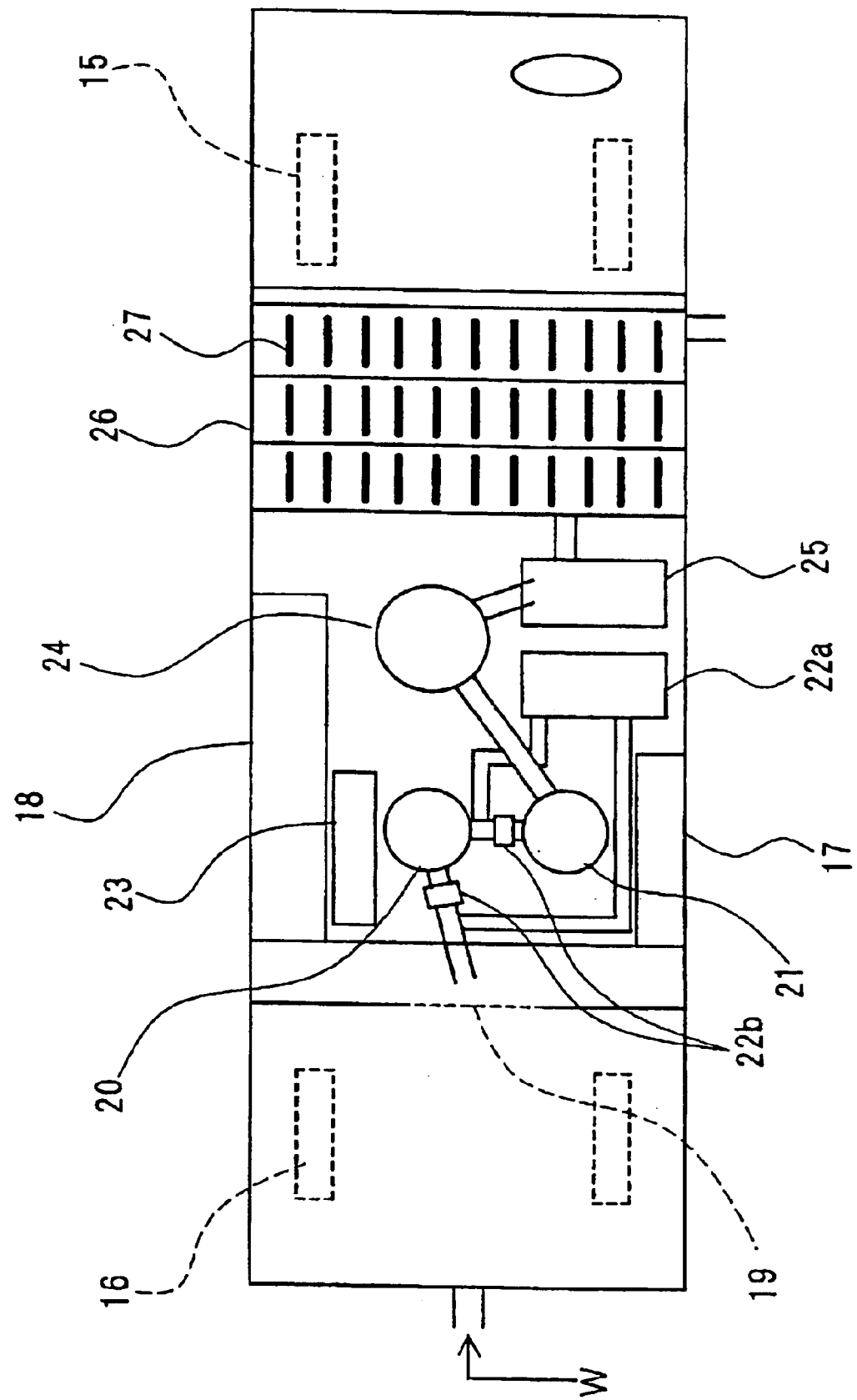
FIG. 3 is a plan view showing the arrangement of the advanced in-vehicle water treatment system appearing in FIG. 2.

FIG. 2 and FIG. 3 show another embodiment of the present invention. It should be noted that redundant description of component parts and elements which have been described above with reference to FIG. 1 will be omitted. This embodiment shows an in-vehicle water treatment system. A large-sized truck 15 has a loading platform provided with a storage tank 16 for drawing in waste water W by vacuum. Reference numeral 17 designates a vacuum generator for generating vacuum with which the waste water W is drawn in. Reference numeral 18 designates a generator unit.

The waste water W in the storage tank 16 is sequentially transferred to ozone treatment tanks 20 and 21 through a screen 19. In the case of the in-vehicle water treatment system, the "aqueous hydrogen peroxide treatment tank" is omitted due to a narrow space of the loading platform, but the ozone treatment tanks 20 and 21 have enhanced capabilities of ozone treatment. Each of the ozone treatment tanks 20 and 21 includes an ozone generator 22a, an ozone bubble-forming device 22b, and a waste ozone-disposal treatment device 23. After the waste water W has passed through the ozone treatment tanks 20 and 21, it is sent to an ultraviolet radiation tank 24, where harmful substances contained therein are farther decomposed by ultraviolet rays.

The waste water W, having passed through the ultraviolet radiation tank 24, is guided to a carbonized filter medium treatment tank 25. The carbonized filter medium treatment tank 25 has sand heaped up therein for removing solid components from the waste water W by filtration. Then, finally, the waste water W is transferred to a retention tank 26 which has a plurality of carbonized filter mediums arranged therein. The waste water W is caused to stay in the retention tank 26 for a predetermined time period to adsorb harmful heavy metals for removal therefrom, so that the waste water W is purified to a water quality level suitable for drinking water, and hence can be discharged to the environment. In this embodiment, since the water treatment system is of an in-vehicle type, it can move to any place as required to treat waste water W.

Industrial Applicability

According to the present invention, harmful substances, such as dioxins and the like, can be subjected to reliable oxidative destruction, and hence it is possible to break a vicious circle of toxic substances through wastes from human bodies and industrial waste water.

What is claimed is:

1. An advanced water treatment process for bringing minute bubbles of ozone into contact with water to be treated which contains harmful substances including dioxins and PCB to carry out oxidative destruction of the harmful substances contained in the water to be treated, the advanced water treatment process comprising:

mixing together ozone generated from an ozone generator and the water to be treated to obtain water to be treated which contains ozone;

passing the water to be treated which contains ozone through an ozone bubble-forming device arranged in a water pipe to obtain water to be treated which contains minute bubbles of ozone, bringing the minute bubbles of ozone into contact with the water to be treated;

supplying to at least one ozone treatment tank the water to be treated which contains the minute bubbles of ozone; and carrying out oxidative destruction of the harmful substances in the water to be treated.

2. The advanced water treatment process according to claim 1, wherein the minute bubbles of ozone have an average particle diameter of 0.5 to 3 $\mu$m.

3. The advanced water treatment process according to claim 1, wherein the minute bubbles of ozone have an average particle diameter of 20 to 80 $\mu$m.

4. The advanced water treatment process according to claim 1, wherein the at least one ozone treatment tank includes a plurality of ozone treatment tanks arranged at respective successive stages, such that waste ozone in a latter-stage one of the ozone treatment tanks is circulated to a former-stage one of the ozone treatment tanks.

5. The advanced water treatment process according to claim 1, wherein prior to an ozone treatment, or posterior to the ozone treatment, a hydrogen peroxide treatment using a hydrogen peroxide solution is carried out for the water to be treated.

6. The advanced water treatment process according to claim 5, wherein prior to the treatment by using the hydrogen peroxide solution, the water to be treated is adjusted to a pH of 8 to 10.

7. The advanced water treatment process according to claim 1, wherein an ultraviolet radiation treatment is carried out for the water to be treated after the ozone treatment, the water containing residual ozone which did not act in the oxidative destruction of the harmful substances.

8. An advanced water treatment process for bringing minute bubbles of ozone into contact with water to be treated, which contains harmful substances including dioxins and PCB, thereby carrying out oxidative destruction of the harmful substances, wherein prior to an ozone treatment, or posterior to the ozone treatment, a treatment by using a hydrogen peroxide solution is carried out for the water to be treated and a foul-odor air generated from the water within a treatment system is formed into minute bubbles such that the minute bubbles of the foul-odor air are mixed into the hydrogen peroxide solution so that the foul-odor air undergoes oxidative destruction.

9. The advanced water treatment process according to claim 8, wherein the minute bubbles of the foul-odor air have an average particle diameter of 0.01 to 0.02 mm.

10. An advanced water treatment process for bringing minute bubbles of ozone into contact with water to be treated which contains harmful substances including dioxins and PCB to carry out oxidative destruction of the harmful substances contained in the water to be treated, the advanced water treatment process comprising:

mixing together ozone generated from an ozone generator and the water to be treated to obtain water to be treated which contains ozone;

supplying the water to be treated which contains ozone to an ozone treatment tank, the ozone treatment tank having an ozone bubble-forming device provided on its bottom; and subjecting the water to be treated which contains ozone to a forced convection state within the ozone treatment tank to obtain water to be treated which contains minute bubbles of ozone, bringing the minute bubbles of ozone into contact with the water to be treated.

11. The advanced water treatment process according to claim 10, wherein the minute bubbles of ozone have an average particle diameter of 10 to 20 $\mu$m.

12. The advanced water treatment process according to claim 10, wherein the minute bubbles of ozone have an average particle diameter of 50 to 60 $\mu$m.

13. The advanced water treatment process for bringing minute bubbles of ozone into contact with water to be treated, which contains harmful substances including dioxins and PCB, thereby carrying out oxidative destruction of the harmful substances, wherein at least one of gold, copper oxide, and iron oxide is thrown into the water which is to be subjected to the treatment by using the hydrogen peroxide solution, thereby promoting an oxidation treatment by the hydrogen peroxide solution.

14. An advanced water treatment process for bringing minute bubbles of ozone into contact with water to be treated, which contains harmful substances including dioxins and PCB, thereby carrying out oxidative destruction of the harmful substances, wherein prior to the ozone treatment, an electrolysis treatment is carried out for the water to be treated.

15. An advanced water treatment process for bringing minute bubbles of ozone into contact with water to be treated, which contains harmful substances including dioxins and PCB, thereby carrying out oxidative destruction of the harmful substances and irradiating ultraviolet light, wherein irradiating ultraviolet light includes an ultraviolet radiation treatment tank is arranged within a treatment system, the ultraviolet radiation treatment tank having an ultraviolet light source arranged therein and inner walls thereof coated with titanium dioxide, ultraviolet ray is irradiated onto the inner walls to thereby cause a photocatalytic treatment for deodorizing a foul-odor within the ultraviolet radiation treatment tank.

16. An advanced water treatment system for purifying water to be treated which contains harmful substances including dioxins and PCB, the advanced water treatment system comprising:

a water pipe through which the water to be treated is introduced into an ozone treatment tank, the water to be treated containing ozone generated by an ozone generator; and the ozone treatment tank having an ozone bubble-forming device provided on its bottom, in which the water to be treated which contains ozone is subjected to forced convection to generate minute bubbles of ozone, effecting oxidization of the harmful substances contained in the water to be treated.

17. The advanced water treatment system according to claim 16, wherein the ozone supply means forms ozone into minute bubbles having an average particle diameter of 50 to 60 $\mu$m.

18. The advanced water treatment system according to claim 16, wherein the ozone supply means forms ozone into minute bubbles having an average particle diameter of 10 to 20 $\mu$m.

19. An advanced water treatment system for purifying water to be treated, which contains harmful substances including dioxins and PCB, the advanced water treatment system comprising an ozone treatment tank for bringing minute bubbles of ozone into contact with the water to be treated, thereby carrying out oxidative destruction of the harmful substances, including a hydrogen peroxide solution treatment tank at a water inlet side or a water outlet side of the ozone treatment tank and including foul-odor supply means for forming a foul-odor air generated from the water within the treatment system into minute bubbles such that the minute bubbles of the foul-odor air are mixed into the hydrogen peroxide solution.

20. The advanced water treatment system according to claim 19, wherein the foul-odor supply means causes the minute bubbles of the foul-odor air to have an average particle diameter of 0.01 to 0.02 mm.

21. An advanced water treatment system for purifying water to be treated which contains harmful substances including dioxins and PCB, the advanced water treatment system comprising:

ozone supplying means for introducing ozone generated by an ozone generator to a water pipe through which the water to be treated passes, supplying minute bubbles of ozone obtained with an ozone bubble-forming device provided in the water pipe; and at least one ozone treatment tank in which oxidation of the harmful substances is effected by using the minute bubbles of ozone that are brought into contact with the water to be treated.

22. The advanced water treatment system according to claim 21, including an ultraviolet radiation treatment tank at an outlet side of the ozone treatment tank, the ultraviolet radiation treatment tank having an ultraviolet light source arranged therein and inner walls thereof coated with titanium dioxide.

23. The advanced water treatment system according to claim 21, wherein the ozone supply means forms ozone into minute bubbles having an average particle diameter of 20 to 80 $\mu$m.

24. The advanced water treatment system according to claim 21, wherein the at least one ozone treatment tank includes a plurality of ozone treatment tanks arranged at respective successive stages, such that extra ozone coming up from the water to be treated in a latter-stage one of the ozone treatment tanks is circulated to a former-stage one of the ozone treatment tanks.

25. The advanced water treatment system according to claim 21, including a hydrogen peroxide solution treatment tank at a water inlet side or a water outlet side of the ozone treatment tank.

26. The advanced water treatment system according to claim 21, wherein the ozone supply means forms ozone into minute bubbles having an average particle diameter of 0.5 to 3 $\mu$m.

27. An advanced water treatment system for purifying water to be treated, which contains harmful substances including dioxins and PCB, the advanced water treatment system comprising an ozone treatment tank for bringing minute bubbles of ozone into contact with the water to be treated, thereby carrying out oxidative destruction of the harmful substances including an ultraviolet radiation treatment tank at an outlet side of the ozone treatment tank, the ultraviolet radiation treatment tank having an ultraviolet light source arranged therein and inner walls thereof coated with titanium dioxide, wherein the ultraviolet radiation treatment tank has a plurality of partition walls coated with titanium dioxide, the partition walls being arranged such that a distance between adjacent ones thereof is within 30 cm.

28. The advanced water treatment system according to claim 27, wherein the ultraviolet radiation treatment tank has a body in the form of a bottomed hollow cylinder extending vertically, an ultraviolet lamp being arranged in a diametrical center of the body, with the plurality of partition walls having plate surfaces radially extending toward the ultraviolet lamp positioned in the center of the arrangement of partition walls.

29. The advanced water treatment system according to claim 28, including a carbonized filter medium treatment tank arranged at a water outlet side of the ultraviolet radiation treatment tank, the carbonized filter medium treatment tank having a conifer carbonized filter material obtained by carbonizing raw materials of plural kinds of conifer, including cedar, pine, and Japanese cypress (hinoki) at a high temperature range of 800 to 900° C.

30. An advanced water treatment process according for bringing minute bubbles of ozone into contact with water to be treated, which contains harmful substances including dioxins and PCB, thereby carrying out oxidative destruction of the harmful substances, wherein an ultraviolet radiation treatment is carried out for the water to be treated after the ozone treatment, the water containing residual ozone which did not act in the oxidative destruction of the harmful substances and after the ultraviolet radiation treatment, an electrolysis treatment and a carbonized filter medium contact treatment are carried out for the water to be treated.

* * * * *